US007009119B2

(12) United States Patent
Carlucci et al.

(10) Patent No.: US 7,009,119 B2
(45) Date of Patent: Mar. 7, 2006

(54) WEIGHT SCALE CONTROL SYSTEM AND PAD

(75) Inventors: Vito James Carlucci, Stratford, CT (US); Paul Joseph Denhup, Stratford, CT (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 10/726,020

(22) Filed: Dec. 2, 2003

(65) Prior Publication Data

US 2004/0129463 A1    Jul. 8, 2004

Related U.S. Application Data

(60) Provisional application No. 60/430,518, filed on Dec. 2, 2002.

(51) Int. Cl.
*G01G 19/00* (2006.01)
*G01G 21/22* (2006.01)

(52) U.S. Cl. ..................................... 177/199; 177/262
(58) Field of Classification Search ............. 177/25.19, 177/177, 199–200, 262, 126, DIG. 9, 50, 177/144

See application file for complete search history.

(56) References Cited

U.S. PATENT DOCUMENTS

| | | | | |
|---|---|---|---|---|
| 3,657,475 A | * | 4/1972 | Peronneau et al. | 178/18.05 |
| 3,722,611 A | * | 3/1973 | Tirkkonen | 177/144 |
| 3,811,523 A | * | 5/1974 | Artwick et al. | 177/180 |
| 4,043,413 A | * | 8/1977 | Schaenen | 177/126 |
| 4,065,962 A | | 1/1978 | Shoberg | 73/862.628 |
| 4,082,153 A | * | 4/1978 | Provi | 177/177 |
| 4,261,429 A | | 4/1981 | Lockery | 177/211 |
| 4,366,873 A | * | 1/1983 | Levy et al. | 177/25.19 |
| 4,419,902 A | | 12/1983 | Somal | 73/862.633 |
| 4,467,661 A | | 8/1984 | Somal | 73/862.382 |
| 4,485,881 A | | 12/1984 | Tramposch et al. | 177/211 |
| 4,505,345 A | | 3/1985 | Jetter | 177/211 |
| 4,506,746 A | | 3/1985 | Lockery | 177/211 |
| 4,542,800 A | | 9/1985 | Knothe et al. | 177/211 |
| 4,558,757 A | * | 12/1985 | Mori et al. | 178/18.05 |
| 4,576,244 A | | 3/1986 | Zeigner et al. | 177/245 |
| 4,600,066 A | | 7/1986 | Griffen et al. | 177/211 |
| 4,605,919 A | | 8/1986 | Wilner | 338/2 |
| 4,677,569 A | * | 6/1987 | Nakano et al. | 704/275 |
| 4,678,050 A | | 7/1987 | Wirth et al. | 177/229 |
| 4,764,981 A | * | 8/1988 | Miyahara et al. | 398/33 |
| 4,785,896 A | | 11/1988 | Jacobson | 177/211 |
| 4,848,477 A | * | 7/1989 | Oldendorf et al. | 177/25.14 |
| 4,848,493 A | | 7/1989 | Hitchcock | 177/211 |

(Continued)

FOREIGN PATENT DOCUMENTS

DE    29 17 169    6/1979

OTHER PUBLICATIONS

International Search Report dated Jul. 4, 2005 from PCT/US2003/38209.

*Primary Examiner*—Randy W. Gibson
(74) *Attorney, Agent, or Firm*—Lawrence Cruz; Steven A. Garner

(57) ABSTRACT

The present invention is directed to a weight scale having a control system that prompts users for their identity and then displays any one or more of: present weight, past weights, target weights and/or the differences therebetween, as well as a graphical representation of weight vs. time. Another feature of the present invention is the use of a viscoelastic foam pad on the surface of the scale for comfort and sanitary benefits.

20 Claims, 3 Drawing Sheets

U.S. PATENT DOCUMENTS

| | | | | |
|---|---|---|---|---|
| 4,848,494 A | | 7/1989 | Cornelius et al. | 177/259 |
| 4,876,805 A | * | 10/1989 | Peoples | 36/43 |
| 4,964,478 A | | 10/1990 | Stadler et al. | 177/229 |
| 4,993,506 A | | 2/1991 | Angel | 177/211 |
| 5,058,691 A | * | 10/1991 | Sela | 177/50 |
| 5,121,962 A | | 6/1992 | Weber et al. | 297/214 |
| 5,143,164 A | * | 9/1992 | Nahar | 177/50 |
| 5,195,599 A | * | 3/1993 | Salini | 177/189 |
| 5,232,064 A | * | 8/1993 | Kroll et al. | 177/211 |
| 5,319,817 A | * | 6/1994 | Hay et al. | 5/611 |
| 5,434,367 A | * | 7/1995 | Salini | 177/189 |
| 5,440,077 A | | 8/1995 | Konishi et al. | 177/185 |
| 5,459,289 A | | 10/1995 | Burkhard | 177/244 |
| 5,510,581 A | | 4/1996 | Angel | 177/211 |
| 5,510,784 A | | 4/1996 | Polaert et al. | 341/34 |
| 5,512,713 A | | 4/1996 | Naito et al. | 177/211 |
| 5,525,762 A | | 6/1996 | Maaz et al. | 177/229 |
| 5,646,375 A | | 7/1997 | Neuman | 177/54 |
| 5,700,982 A | | 12/1997 | Newman | 177/229 |
| 5,719,357 A | | 2/1998 | Eger et al. | 177/184 |
| 5,723,826 A | | 3/1998 | Kitagawa et al. | 177/211 |
| 5,750,937 A | * | 5/1998 | Johnson et al. | 177/25.11 |
| 5,756,943 A | | 5/1998 | Naito et al. | 177/211 |
| 5,786,549 A | | 7/1998 | Serizawa | 177/211 |
| 5,892,180 A | * | 4/1999 | Carey | 177/144 |
| 5,929,390 A | | 7/1999 | Naito et al. | 177/211 |
| 5,929,391 A | | 7/1999 | Petrucelli et al. | 177/211 |
| 6,038,465 A | * | 3/2000 | Melton, Jr. | 600/407 |
| 6,407,351 B1 | * | 6/2002 | Meyer et al. | 177/238 |
| 6,426,471 B1 | * | 7/2002 | Gubitose | 177/25.15 |
| 6,797,894 B1 | | 9/2004 | Montagnino et al. | 177/238 |
| 6,844,506 B1 | * | 1/2005 | Nuesch et al. | 177/25.11 |

* cited by examiner

WEIGHT SCALE CONTROL SYSTEM AND PAD

This application claims the benefit of Provisional Application No. 60/430,518, filed Dec. 2, 2002.

BACKGROUND OF THE INVENTION

1. Field of the Invention

The present invention relates to weight scales. More particularly, the present invention relates to bathroom-type scales having a variety of control sequences designed to enable one or more users to track and record weight history.

2. Description of Related Art

Various known weight scales generally provide an upper platform for the user to stand on, having load detection cells positioned beneath. The load from the weight of the user is transmitted from the platform to the load detection cells, which are mounted to a base. The load on the cells is measured by the cells and communicated to a controller, which causes an output display of the user's weight.

It is desirable for users to record their weights to analyze the progression of weight loss or gain patterns. This may be true for one or more users of the same scale. Known scales do not provide these characteristics.

It is further desirable to provide a comfortable, supportive and sanitary surface for barefoot users. Most scales are used while a user is barefoot. As a result, most scales are provided with hard, easily wiped surfaces. These surfaces tend to be cold and uncomfortable. A soft, supportive surface provides comfort and warmth for users. It is important that the surface be easily cleaned and disinfected to prevent spread of germs, odor and fungus.

SUMMARY OF THE INVENTION

It is an object of the present invention to provide a weight scale that overcomes the above-identified shortcomings of known scales.

These and other objects and advantages of the present invention are achieved by a weight scale having automated control functions that store prior weight readings and compare them to successive weight readings for one or more users, displaying the results of the comparisons. The weight scale is also provided with a pad made of viscoelastic foam to provide comfort, support and sanitary benefits to the users.

DETAILED DESCRIPTION OF THE INVENTION

Figure 1:
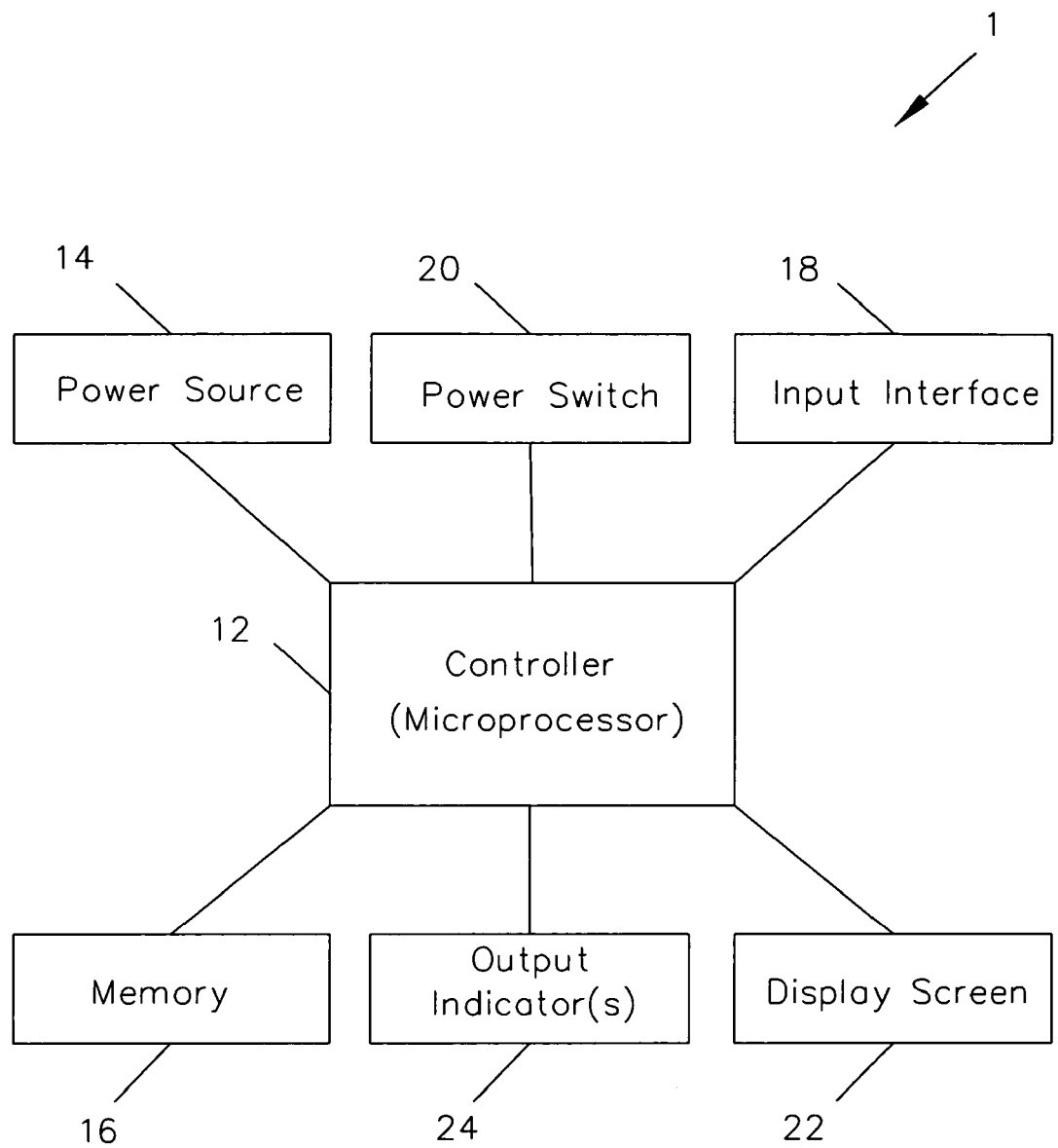
FIG. 1 is a schematic diagram of a weight scale control system according to the present invention.
Figure 2:
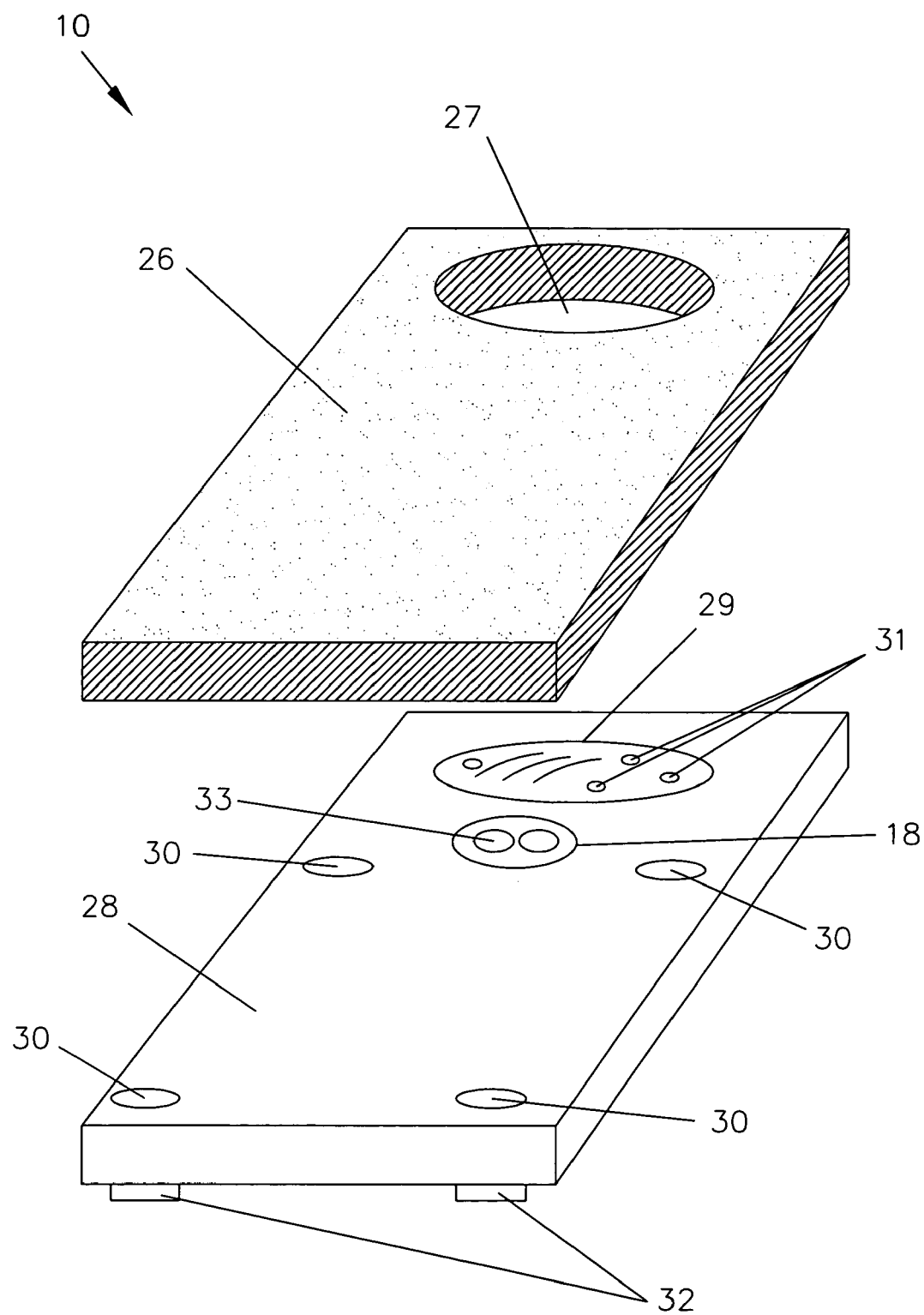
FIG. 2 is a schematic diagram of a viscoelastic pad positioned over a scale according to the present invention.

Referring to the drawings and, in particular, FIG. 1, a weight scale system in accordance with an illustrative embodiment of the present invention is shown and generally represented by reference numeral 1. Weight scale system 1, in a preferred embodiment of the present invention, is operatively incorporated into a scale 10 such as shown in FIG. 2. The weight scale system 1 according to the present invention has a controller 12, a power source 14, one or more data memories 16, an input interface 18, a power control 20, a display screen 22, and an output indicator 24.

Controller 12 may preferably be any appropriate microprocessor capable of receiving input information, via input interface 18, for example, interpreting and/or otherwise manipulating input information, via data memories 16, for example, and providing informative and appropriate output information, via output indicator 24, for example.

Power source 14 may preferably be either an AC source such as is provided by a typical electrical socket in a home, or a DC source such as is provided by a typical battery, or some combination of both. Power source 14 may be integral with scale 10 and/or separately connected thereto as appropriate for a particular application.

Each data memory 16 may preferably be suitable to store data relevant to a particular individual for any of a variety of predefined time periods. For example, data memories 16 may retain certain information for a set period of time, such as, for example, a day, week, or month. Additionally, or alternatively, data memories 16 may retain certain other information for an indefinite period of time or until an operator intentionally deletes the information.

Input interface 18 can preferably have any of a variety of configurations. Input interface 18 may be a tactile interface such as a touch-pad, a touch-screen, or a keyboard, for example. Additionally, or alternatively, input interface 18 can be an audible input, such as, for example, a voice recognition system. Preferably, input interface 18 is user friendly, easy to access, and durably configured to withstand the wear and tear associated with use.

Power control 20 can preferably have any of a variety of configurations. For example, power control 20 can be an automatic switch that automatically activates system 1 and/or scale 10 when a user steps onto the scale. Alternatively, power control 20 may be a manual control switch that requires a user action, in addition to stepping on the scale, in order to activate system 1 and/or scale 10.

Display screen 22 may preferably be any of a variety of shape, sizes and/or configurations. For example, display screen 22 may be an LCD display or an LED display. Display screen 22 may preferably cooperate with controller 12, power source 14, data memories 16 and/or output indicators 24, to provide a user with appropriate comparative weight information.

Output indicators 24, as with each of the other elements of system 1, may preferably be of any of a variety of configurations. For example, in a preferred embodiment or aspect of the present invention, one or more of the output indicators 24 may be audible signal generators. In addition, or alternatively, one or more of the output indicators 24 may be tactile signal generators, such as, for example, a vibrating mechanism (not shown).

Referring now to FIG. 2, scale 10 is shown in association with a top pad 26. Scale 10 may have a housing 28 preferably be ergonomically formed and can have any shape, size and/or configuration suitable for any of a variety of purposes, functional and/or aesthetic. Housing 28 may be provided with a scale display window 29. Scale display window 29 may preferably be suitable to protectively cover display 22. Scale display window 29 may, in one aspect of the present invention, have input interface 18 and/or output indicator 24 operatively connected thereto. In this aspect of the invention, scale display window 29 may allow only limited user interaction to prevent against any inadvertent or unwanted interference in the operation of scale 1 and/or system 10.

As shown, in a preferred aspect or embodiment of the present invention, pad 26 can be removably connected to scale 10 for easy, efficient cleaning and/or replacement. However, in an alternative embodiment of the invention, pad 26 may be securely connected to scale 10 in a permanent manner. Pad 26 may preferably be ergonomically formed and can be appropriately shaped, sized and/or configured to complement scale 10. For example, pad 26 may preferably have a pad display window 27 that may be aligned with scale display window 29 of scale 10.

Pad 26 may preferably be formed of any of a variety of materials having elastic recovery characteristics. For example, in another preferred aspect or embodiment of the present invention, pad 26 can be formed of a viscoelastic material, which is an open-cell foam known in the industry as "memory foam", and which preferably has a high resiliency and longevity. Pad 26 preferably also has hypoallergenic, antibacterial, and/or antifungal properties. In one aspect of the present invention, pad 26 can preferably be easily washed or cleaned.

Figure 3:
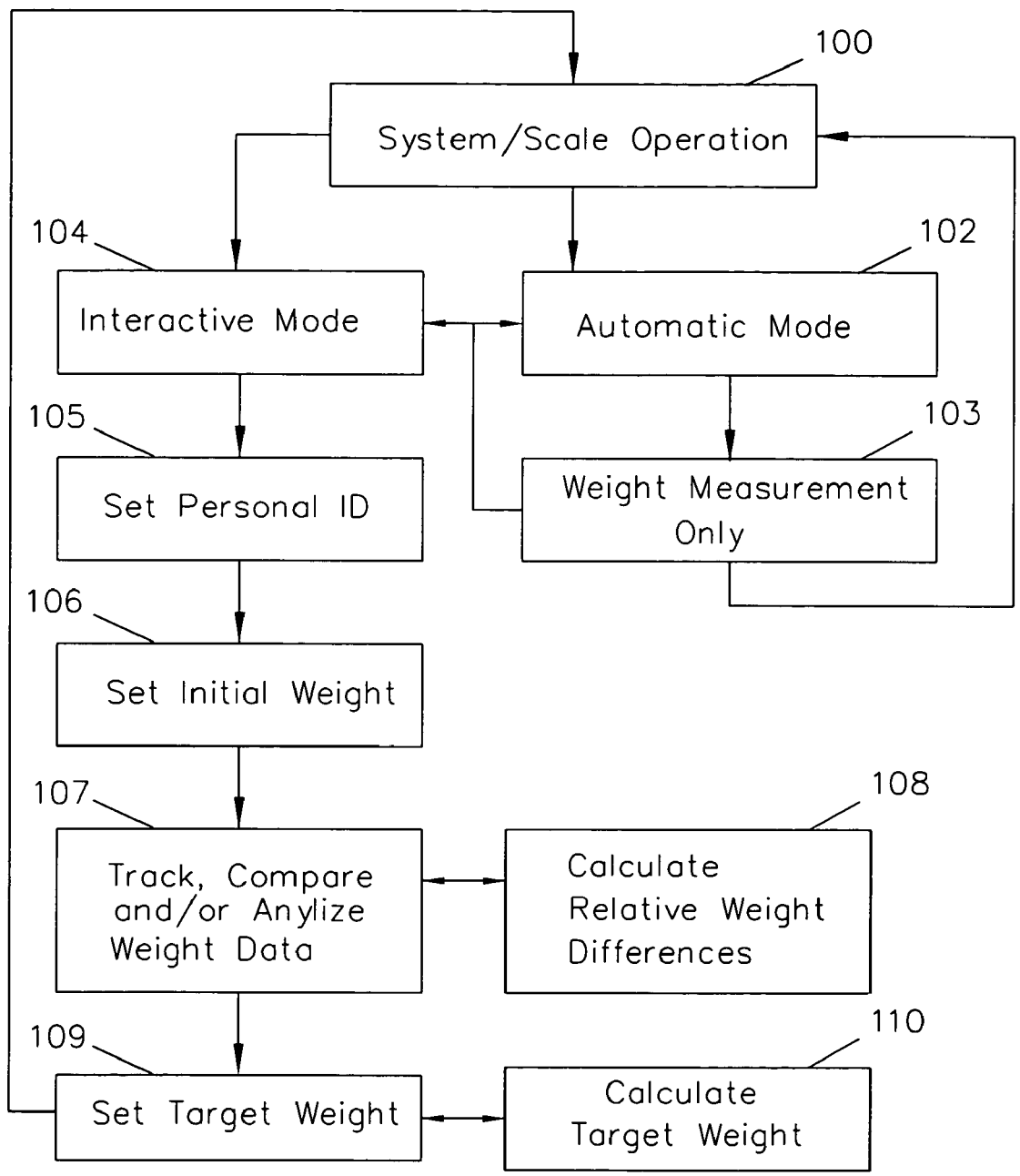
FIG. 3 is an operation flow chart in accordance with an illustrative embodiment of the present invention.

Referring now to FIG. 3, in accordance with an illustrative embodiment of the present invention scale system 1 and/or scale 10 may be operated in any of a variety ways. For example, as reflected in box 100, an operator may activate system 1 and/or scale 10 by tapping on scale 10 activating power switch 20 to provide power from power source 14. After tapping scale 10, the operator may be required to wait for a predefined period of time (e.g. 3 seconds), during which time an initiating image (e.g., "88·8.8"") appears on display 22. After the predefined time period, a ready image (e.g., "0.0") appears on display 22 indicating to the operator that system 1 and/or scale 10 is ready for operation.

Once system 1 and/or scale 10 are ready for operation, as indicated by boxes 102 and 103, system 1 and/or scale 10 may be operated more in an automatic mode, for example, to measure weight only. In this aspect or embodiment of the present invention, the operator can step onto scale 10 and one or more positioning sensors 30, which are preferably optimally distributed throughout scale 10 to detect at least a portion of the operator's weight, may cooperate with one or more positioning indicators 31 to advise the operator to move on scale 10 in order to center his/her weight on the scale. More detail relating to positioning indicators 31 is provided in copending U.S. patent application Ser. No. 10/308,993, filed Dec. 12, 2002 incorporated herein by reference.

For illustrative purposes of the present invention, sensors 30 may be positioned at roughly each corner of scale 10, assuming housing 28 has a square shape and indicators 31 may be displayed on display 22. Preferably, each sensor 30 may detect at least a portion of the operator's total weight. The sum of the weight detected by all of the sensors is preferably equal to the total load on the scale or the operator's total weight. Sensors 30 may be of any suitable type known in the art. For example, sensors 30 can be a conventional strain gauge.

In another aspect or embodiment of the present invention, housing 28 may be provided with one or more feet or supports 32 that are preferably movable with respect to housing 28. The relative movement of supports 32 relative to housing 28 is preferably in direct response to loading of scale 10. In this embodiment one or more sensors 30 may preferably be positioned at least approximately directly above each support 32 and can be operatively connected thereto so that any relative movement of supports 32 may be detected or measured by sensors 30. Thus, sensors 30 and supports 32 preferably cooperate to obtain a more accurate weight measurement.

Once the operator is properly positioned on scale 10, an indicator, such as, for example, a flashing image on display 22 or an audible beep, is provided for a predefined period of time (e.g., 2 seconds), after which time system 1 and/or scale 10 preferably locks to enable consistent accurate measuring. After a weight measurement is taken, the measurement reading may preferably remain displayed for a predefined period of time (e.g., 8 to 10 seconds) and absent any further action by the operator scale 10 will preferably automatically power off to conserve energy.

It is noted that the measured weight of the operator may be indicated in any of a variety of ways. For example, by displaying the measurement on display 22 for a predefined period of time (e.g., 2 seconds) and/or by flashing the measurement for a predefined pattern (e.g., 3 times). The measurement may be displayed for only a limited period of time to conserve energy, with or without weight on scale 10. The weight measurement may be displayed in any of a variety of measuring units (e.g., pounds, kilograms, grams, etc.). In one aspect of the present invention, system 1 and/or scale 10 may have an indicator for indicating to the operator that a predefined maximum weight capacity has been exceeded. In another aspect of the present invention, system 1 and/or scale 10 can automatically zero itself after each operator steps of scale 10 or, alternatively, prior to each new operator standing on scale 10.

As reflected in boxes 104 through 110, in operation system 1 and/or scale 10, in a preferred aspect of the present invention, may also be operated in an interactive mode to set and/or store measurement information. For example, as reflected in box 105, one or more personal identifiers may be programmed or set via user interface 18. That is, interface 18 may be activated and an operator may thereby be prompted, visually and/or audibly, to enter identifying information. For instance, display screen 22 may display "USER?" and the operator can enter letters or numbers using interface 18, which is operatively connected to system 1 and/or scale 10 or, alternatively, to a remote control unit. A voice command system may be used as well or in place a display indicator.

In one aspect of the present invention, any number of operators may have various stored information associated with their personal identifier. For example, as reflected by box 106, any one or more operators can set an initial weight by activating system 1 and/or scale 10, as outlined above with respect to operating in automatic mode, for instance, and after taking a weight measurement, actuating a set key 33 of interface 18 to store or save the taken weight measurement in memory 16. Display screen 22 may then display, at any time, a current weight measurement and/or the last or last stored measured weight for any one or more particular operators. Display 22 may also display the date of any of the stored weight measurements.

In another aspect of the present invention, as reflected by box 107, while the operator is standing on scale 10 the present or current weight may be displayed and/or the difference between the last weight measurement and the current weight measurement, which may be computed, as reflected by box 108, by controller 12. Thus, preferably the current weight measurement and any number of prior weight measurements or readings may be stored in memory 16.

In still another aspect of the present invention, as reflected by box 109, a target weight or a goal may be set manually by an operator for comparison with present and/or past weight measurements, with the differences preferably being displayed on display screen 22. Also, as reflected by box 110, the target weight may be automatically calculated using other variables (e.g., body type, age, gender, etc.). Display screen 22 and/or any other output indicator 24 may be used to prompt or signal the operator for the various operations. Additionally, or alternatively, measurement results and comparisons of successive weighings may be provided using line or bar graphs or similar indicators on display screen 22, preferably showing weight measurements on various dates and over different time periods. Further, display screen 22 may be a scrolling display and/or suitable to show multiple pieces of information at the same time. For example, display screen 22 may simultaneously display, in any of a variety of combinations, actual or current weights, last or stored weights, target or goal weights, and/or differences between actual and goal weights.

It is noted that the various operating features identified above may be performed in any of a variety of orders or patterns as desired and that any such variation falls within the scope of the present invention.

Thus, system 1 and/or scale 10 preferably may be easily initiated and operate either automatically in a conventional weighing mode and/or manually in a user interactive mode wherein any of a number of different operators may selectively store and/or retain weight measurement data or information to compare, track, or otherwise use the information.

Having identified and discussed some of the preferred aspects or embodiments of the present invention, system 1 and/or scale 10 may be provided with any of a variety of other options, such as, for example, codes may be used to limit access to information as desired. Also, indicators may be used to warn an operator when they fall below and/or above their optimal weight for their particular body time (e.g., petite, small, medium, or large). Other like functions, obvious to those skilled in the art, may also be provided and fall within the scope of the present invention.

The present invention having been thus described with particular reference to the preferred forms thereof, it will be obvious that various changes and modifications may be made therein without departing from the spirit of the present invention as defined herein.

What is claimed is:

1. A method of determining a user's weight comprising the steps of:
   providing a scale with one or more sensors, one or more supports that are movable with respect to said scale, and a display;
   activating said scale;
   detecting at least a portion of said user's weight via said one or more sensors, wherein the user stands on said scale with said supports being movable with respect to said scale; and
   displaying the sum of the weight detected by all of said one or more sensors or the total load on said scale,
   wherein said one or more sensors and said one or more supports are operatively connected so that said relative movement of said one or more supports with respect to said scale may be measured via said one or more sensors.

2. The method of claim 1, wherein said step of activating said scale comprises tapping said scale at a predefined location.

3. A method of determining a user's weight comprising the steps of: providing a scale with a one or more sensors, one or more supports that are movable with respect to said scale, and one or more indicators operatively connected to said one or more sensors and/or said one or more supports; activating said scale; positioning a user on said scale; indicating to said user via said one or more indicators the user's relative position with respect to said one or more sensors and/or said one or more supports; re-positioning said user in accordance with said indicators; and measuring said user's weight.

4. The method of claim 3, wherein said scale has a display for displaying said user's measured weight.

5. The method of claim 3, wherein said step of activating said scale comprises tapping a predefined portion of said scale.

6. A weight scale comprising:
   one or more sensors for detecting at least a portion of a user's weight when the user stands on said scale;
   one or more supports that are movable with respect to said scale; and
   a display,
   wherein said one or more sensors and said one or more supports are operatively connected so that said relative movement of said one or more supports with respect to said scale may be measured via said one or more sensors, and
   wherein said weight scale displays, via said display, the sum of the weight detected by all of said one or more sensors or the total load on said scale.

7. The weight scale of claim 6, wherein said scale is activated by tapping said scale at a predefined location.

8. The weight scale of claim 6, further comprising one or more indicators operatively connected to said one or more sensors and/or said one or more supports.

9. The weight scale of claim 8, wherein said indicators indicate to said user the user's relative position with respect to said one or more sensors and/or said one or more supports.

10. The weight scale of claim 6, wherein said display displays said user's measured weight.

11. The weight scale of claim 6, further comprising:
    a housing having a scale display window; and
    a pad overlying at least a portion of said housing and having a pad display window corresponding in size and shape to said scale display window.

12. The weight scale of claim 11, further comprising a control system having a controller and memory operatively connected to an input interface, and one or more output indicators.

13. The weight scale of claim 11, wherein said housing is ergonomically configured and suitable for domestic use.

14. The weight scale of claim 11, wherein said pad is formed of a material having elastic recovery characteristics.

15. The weight scale of claim 11, wherein said pad is formed from a viscoelastic material.

16. The weight scale of claim 12, wherein said input interface is a tactile operator interface.

17. The weight scale of claim 12, wherein said input interface is selected from the group consisting of a remote control and a voice command system.

18. The weight scale of claim 12, wherein said one or more output indicators include a visual indicator, an audible indicator, and/or a tactile indicator.

19. The weight scale of claim 6, wherein said one or more sensors are positioned at least approximately directly above said one or more supports.

20. The weight scale of claim 19, wherein said one or more sensors and said one or more supports are operatively connected so that any movement of said one or more supports is measurable via said one or more sensors.

* * * * *